C. H. GALLUP.
HORSESHOE AND DETACHABLE CALK THEREFOR.
APPLICATION FILED MAR. 11, 1915.
1,159,488.
Patented Nov. 9, 1915.
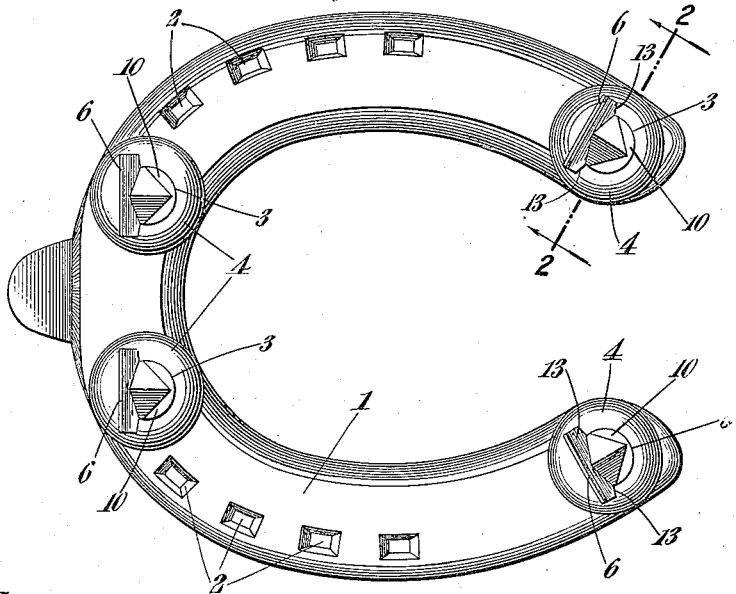
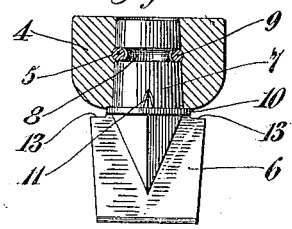 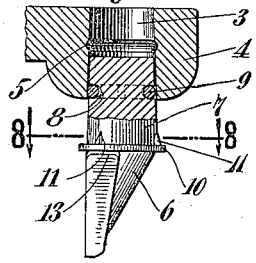 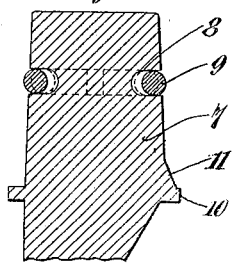
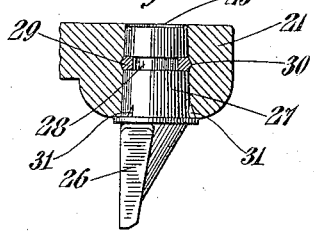 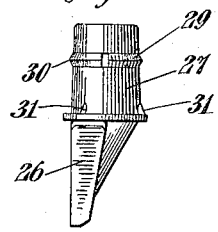 
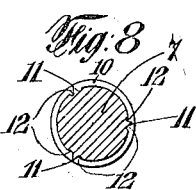
WITNESSES
John E. Prager
A. Worden Gilbs
INVENTOR
Charles H. Gallup
BY
Whitaker Proost
ATTORNEYS

UNITED STATES PATENT OFFICE.

CHARLES H. GALLUP, OF POUGHKEEPSIE, NEW YORK, ASSIGNOR OF ONE-HALF TO W. A. LAWRENCE, OF POUGHKEEPSIE, NEW YORK.

HORSESHOE AND DETACHABLE CALK THEREFOR.

1,159,488. Specification of Letters Patent. Patented Nov. 9, 1915.

Application filed March 11, 1915. Serial No. 13,579.

*To all whom it may concern:*

Be it known that I, CHARLES H. GALLUP, a citizen of the United States, residing at Poughkeepsie, in the county of Dutchess and State of New York, have invented certain new and useful Improvements in Horseshoes and Detachable Calks Therefor; and I do hereby declare the following to be a full, clear, and exact description of the invention, such as will enable others skilled in the art to which it appertains to make and use the same.

My invention consists in the novel features hereinafter described reference being had to the accompanying drawing which illustrates one embodiment of the invention selected by me for purposes of illustration, and slight modifications thereof, and said invention is fully disclosed in the following description and claims.

Referring to the said drawing, Figure 1 is a bottom plan view of a horseshoe provided with detachable calks, the same being one form in which I have contemplated embodying my invention. Fig. 2 represents a cross section on line 2—2 of Fig. 1. Fig. 3 represents a vertical section on the line 3—3 of Fig. 2, showing the spring locking ring in elevation and the calk within the calk receiving recess, but not fully seated therein. Fig. 4 is an enlarged detail sectional view of one of the calks. Fig. 5 is a sectional view similar to Fig. 2 illustrating a slight modification of the invention. Fig. 6 is a detail view of the calk shown in Fig. 5, detached. Fig. 7 is an enlarged sectional view showing another form or cross section of locking ring. Fig. 8 is a section on line 8—8 of Fig. 3, showing my preferred form of positioning projections on the stem of the calk.

In horseshoes provided with detachable calks as now manufactured and used, it is customary to provide the shoe with tapered recesses at proper positions to receive the calks and to provide the calks with tapered stems adapted to be driven into and fit said recesses with a driving fit. With shoes and calks of this character, it frequently happens that the blows applied to the calks by the movements of the horse's feet, loosen these calks and they drop out, causing annoyance and expense to the owners of horses employing this type of shoe.

The object of my invention is to provide a construction by means of which the calks will be positively and permanently locked in position beyond any possibility of accidental displacement, while at the same time they can be readily removed by the use of a suitable tool when it becomes necessary to replace a worn calk with a fresh one.

My invention also contemplates means for positively positioning the several calks with respect to the shoe so that they will be held against rotary movement independently of the locking means, and whereby the successive calks may be inserted in the same shoe in the same positions occupied by their predecessors.

Referring to the accompanying drawing, 1 represents the main body of a horseshoe which may be of any desired form and is provided with the usual nail holes 2 and calk receiving recesses 3 which latter are preferably formed in thickened portions or bosses 4, suitably provided at the desired points on the shoe, and in this instance being arranged as shown, two of such bosses being provided at the center of the curved portion of the shoe, and one being provided at each end of the shoe. Each of the recesses 3 is preferably, though not necessarily, made with a slight taper from the bottom upward, being slightly smaller at the upper end, although in some instances I may form the recesses with cylindrical walls. Each of said recesses is preferably provided at a suitable point between its upper and lower ends with a shallow annular locking groove 5 for the purpose hereinafter fully explained, and this groove may be formed in the shoe when it is manufactured or it may be formed by a blacksmith by means of a suitable tool thereafter. The calk which I prefer to employ with the shoe is provided with a head or ground-engaging portion 6 which may be of any desired form or figuration, and a stem portion 7 which preferably has a slight taper, and which is of such size that it will snugly fit any one of the recesses in the shoe. Each calk is provided with an annular groove 8 in which is placed a locking device 9, consisting of a piece of spring material such as spring wire, or a small rod of any desired cross section which is bent into practically ring form, but without bringing the ends of the locking device together, as clearly shown in Fig. 6, so that the locking device will be free to move in and out in said groove throughout its entire extent.

For convenience I prefer to term this locking device, a split ring by which it is to be understood, a practically annular locking device the ends of which do not meet when the device is in its expanded position and need not meet at any time. The groove 8 in the stem is substantially the same width in a direction longitudinally of the stem as the thickness of the locking ring in the same direction so that the ring cannot move in said groove longitudinally of the calk. The said groove 8 in the stem is of substantially the same or greater depth in a direction transversely of the stem as the thickness of the locking device in the same direction, and as the ends of the locking device do not meet, it follows that when the locking device is compressed inwardly, it will lie practically entirely within said groove. The latter device is so formed that when it is free from compression, its exterior surface, which I call the locking portion of the ring, projects slightly beyond the outer surface of the stem, as clearly shown in Fig. 4.

The stem 7 is also provided with an arresting shoulder 10, preferably annular, which is adapted to engage the shoe when the calk is driven in, and limit the extent to which the calk can be forced into the recess 3 of the shoe. This shoulder is located at a predetermined distance from the annular groove 8 corresponding to the distance between the annular locking groove 5 in the wall of the recess 3 of the shoe 4, and the portion of the outer surface of the shoe which is engaged by the arresting shoulder 10, so that when the shoulder comes into engagement with the shoe, the locking device 9 will be in position to engage the locking groove 5.

I also prefer to provide means for positioning the calks with respect to the shoe so as to prevent them from rotating with respect thereto. This is usually desirable, and is particularly important with the calks having the chisel shaped heads or ground-engaging portions, such as are shown herein, and as a matter of fact, in applying shoes of this character to a horse's foot, the blacksmith will frequently set these calks in particular positions for the purpose of correcting or accommodating a defect of gait. For this purpose, I prefer to provide the wall of the recess 3 and the stem of the calk, one with a longitudinally disposed positioning projection or projections (one or more), indicated at 11, for the purpose of indenting the other part longitudinally and seating themselves so as to prevent the calk from rotating after it has been driven in as far as permitted by the shoulder 10. I prefer to locate these positioning projections or ribs on the stem of the calk, as shown, and in either case, to provide on one or both sides of each of said projections, and preferably on both sides thereof, a shallow longitudinally disposed groove, recess, or depression 12, see Fig. 8, so that as the said projections are crowded into the metal of the wall of the recess, for example, the displaced metal may bulge into and be accommodated by said grooves or depressions 12, thus forming interlocking engagements and facilitating the driving of the calk home.

From the foregoing description and the figures of the drawings, it will be apparent that these calks can be permanently secured in position in the shoe, whether it is secured to the horse's foot or not, by simply inserting the stem of the calk into one of the recesses 3 in the proper position, and driving it in with a hammer or other tool. The stem 7 of the calk enters the recess 3, and the spring locking device will be compressed by the side walls of the recess 3, as shown in Fig. 3, and will not interfere with the driving of the calk. The positioning projections 11 will readily seat themselves in the metal of the recess walls and the calk is driven in until arrested by the shoulder 10, at which time the groove 8 will be opposite the groove 5 in the recess wall, and the spring locking device will instantly expand outwardly so as to engage the locking recess 5, as shown in Fig. 2. It will thus be seen that the calk is positively locked in position both longitudinally and rotarily, and it is impossible to accidentally remove the calk or lose it, as it cannot be removed without first compressing the spring locking device or split ring. At the same time the calk may be removed when worn, either by driving it out in case the shoe is removed from the horse's foot, or by prying it out with a suitable fork shaped tool in a well known way, and I prefer to provide the head portion of the calk with laterally extending shoulders 13, see particularly Figs. 2 and 3, which permit a fork shaped instrument to be inserted between said shoulders 13 and the shoe, to facilitate the removal of the calk, although this is not essential. It will be seen that upon applying power to the calk in a direction longitudinally of its stem, the spring locking device or split ring will be crowded back into the groove 8 and will permit the withdrawal of the stem from the recess 3, the longitudinally positioning projections 11, which are preferably tapered, also drawing out of the recesses which they have formed in the walls of the recess 3. In making the calks, I prefer to locate the longitudinal positioning projections 11 in a predetermined relation with the head 6, or ground-engaging portion of the calk, so that when another calk is inserted in place of a worn one, its positioning projections 11 may be inserted in the same identical recesses which the corresponding projections of a preceding calk have formed in the wall of the recess 3. Hence, if the first calks were carefully placed in position by a blacksmith, all subsequent calks may be placed in exactly the same positions in the calk receiving recesses of the shoe by an unskilled person, and any beneficial results to be obtained thereby, are thus retained.

In Figs. 2, 3, and 4, I have shown the locking device or split ring formed of wire or rod, which is substantially circular in cross section. I may, however, use wire of other cross sections, for example, a rod having a pentagonal cross section, as shown in Figs. 5 and 6, and one having a triangular cross section, as shown in Fig. 7. Either of these forms provides an angular locking surface on the locking device or split ring, as will be readily seen.

In the construction shown in Figs. 5 and 6, 21 represents the body portion of the shoe provided with the calk receiving recess 23, the wall of which is provided with an angular locking groove 25. The calk in this instance is provided with a head or ground-engaging portion 26, and stem 27, the latter being provided with an annular groove 28 to receive the spring locking device 29, which in this instance is provided with an angular exterior locking surface, and is substantially pentagonal in cross section. The calk is also provided with the longitudinally disposed positioning projections 31. When this form of calk is driven in, the sharp exterior locking surface of the split ring, which in this instance forms a virtual knife edge 30, will engage the groove in the inner wall of the recess, and by reason of the elasticity of the spring locking member, hold the calk in place longitudinally.

In Fig. 7 I have shown a slightly modified form of locking ring 19 formed of wire or rod triangular in cross section, and having an angular locking surface forming a sharp edge 20, as shown.

It is to be understood, however, that the calk will be held by the continued pressure outwardly of the locking member, and not because of any wedging of the ring between the stem and the wall of the recess. As before stated, however, I prefer to provide the wall of the recess with a locking groove, which in connection with the form of ring shown in Figs. 5 and 6, could advantageously be made to conform to the exterior locking surface of the ring.

In some instances my improved calk may be used without providing the calk receiving recess with a specially prepared locking groove, especially when the locking ring is provided with a sharp angular exterior locking portion, as indicated in Figs. 5, 6, and 7, for example. The wall of said recess will ordinarily be somewhat rough and even where the calks are driven into recesses not provided with annular locking grooves, the lateral expansion of the spring locking device or split ring will tend to seat it to a certain extent against the wall of the recess and press against said wall with sufficient pressure to prevent the accidental removal of the calk. I prefer, however, to provide the calk receiving recesses with locking grooves, as shown.

What I claim and desire to secure by Letters Patent is:—

1. The combination with a horseshoe having a calk receiving recess therein, circular in cross section, of a detachable calk having a stem constructed to fit said recess and provided with an annular groove and a spring locking split ring engaging said groove, said groove being of a width, longitudinally of the stem, substantially equal to that of the ring, and having a depth substantially equal to the thickness of the ring, whereby the ring may be compressed entirely within said groove, and will exert a spring pressure laterally against the wall of said recess.

2. The combination with a horseshoe having a calk receiving recess therein, circular in cross section, of a detachable calk having a stem constructed to fit said recess and provided with an annular groove and a spring locking split ring engaging said groove, said groove being of a width, longitudinally of the stem, substantially equal to that of the ring, and having a depth substantially equal to the thickness of the ring, the wall of said recess being provided with an annular depression to receive the outer portions of said ring, when the stem of the calk has been driven into the recess to the required extent, to lock the calk against accidental removal from the shoe.

3. The combination with a horseshoe having a calk receiving recess therein circular in cross section, of a detachable calk having a stem constructed to fit said recess and provided with an annular groove, and a spring locking split ring engaging said groove, said groove being of a width, longitudinally of the stem, substantially equal to that of the ring, and having a depth, transversely of the stem, substantially equal to the thickness of the ring, whereby the ring may be compressed entirely within said groove and will exert a spring pressure laterally against the wall of said recess, and means independent of said ring for holding said stem from rotary movement in said recess.

4. The combination with a horseshoe having a calk-receiving recess therein, circular in cross section, of a detachable calk having a stem constructed to fit said recess and provided with an annular groove and a spring locking split ring engaging said groove, said groove being of a width longitudinally of the stem, substantially equal to that of the ring, and having a depth substantially equal to the thickness of the ring, said stem and the wall of said recess being provided the one with a longitudinally disposed rib adapted to embed itself in the other to hold the calk from rotary movement with respect to the shoe, and having vertically disposed recessed portions adjacent to the said rib to accommodate portions of the metal of the other part displaced by said rib.

5. The combination with a horseshoe having a calk receiving recess therein, circular in cross section, of a detachable calk having a stem constructed to fit said recess and provided with an annular groove and a spring locking split ring engaging said groove, said groove being of a width, longitudinally of the stem, substantially equal to that of the ring, and having a depth substantially equal to the thickness of the ring, the wall of said recess being provided with an annular depression to receive the outer portions of said ring, when the stem of the calk has been driven into the recess to the required extent, to lock the calk against accidental removal from the shoe, the said calk having a shouldered portion to engage the exterior of the recessed portion of the shoe and arrest the calk in position to permit said ring to engage the groove in said recess.

6. The combination with a horseshoe having a calk receiving recess therein, circular in cross section, of a detachable calk having a stem constructed to fit said recess and provided with an annular groove and a spring locking split ring engaging said groove, said groove being of a width, longitudinally of the stem, substantially equal to that of the ring, and having a depth substantially equal to the thickness of the ring, the wall of said recess being provided with an annular depression to receive the outer portions of said ring, when the stem of the calk has been driven into the recess to the required extent, to lock the calk against accidental removal from the shoe, the said calk having a shouldered portion to engage the exterior of the recessed portion of the shoe and arrest the calk in position to permit said ring to engage the groove in said recess, said stem being provided with a longitudinally disposed rib adjacent to said shoulder having a predetermined relation to the ground engaging portion of the calk, to embed itself in the walls of said recess when the calk is driven into place, and position the ground engaging portion of the calk with respect to the shoe.

7. As a new article of manufacture, a detachable horseshoe calk, having its stem provided with an annular groove, and provided with a spring split ring engaging said groove, and normally projecting slightly therefrom, said groove being of a width substantially equal to that of the ring, and of a depth transversely of the stem, substantially equal to the thickness of the ring whereby said ring is held at all times from movement longitudinally of said stem, but may be compressed transversely of said stem entirely within said groove.

8. As a new article of manufacture, a detachable horseshoe calk, having its stem provided with an annular groove, and provided with a spring split ring engaging said groove, and normally projecting slightly therefrom, said groove being of a width substantially equal to that of the ring, and of a depth transversely of the stem, substantially equal to the thickness of the ring whereby said ring is held at all times from movement longitudinally of said stem, but may be compressed transversely of said stem entirely within said groove, said stem having a shoulder for engaging the shoe and arresting the calk, located at a predetermined distance from the said groove, corresponding to the distance from the end of a calk receiving recess and an annular locking groove therein of the shoe with which the calk is to be used.

9. As a new article of manufacture, a detachable horseshoe calk, having its stem provided with an annular groove, and provided with a spring split ring engaging said groove, and normally projecting slightly therefrom, said groove being of a width substantially equal to that of the ring, and of a depth transversely of the stem, substantially equal to the thickness of the ring, said calk having its stem provided with a longitudinally disposed positioning rib having a predetermined relation with respect to the ground engaging portion of the calk.

10. As a new article of manufacture, a detachable horseshoe calk, having its stem provided with an annular groove, and provided with a spring split ring engaging said groove, and normally projecting slightly therefrom, said groove being of a width substantially equal to that of the ring, and of a depth transversely of the stem, substantially equal to the thickness of the ring, said calk having its stem provided with a longitudinally disposed positioning rib having a predetermined relation with respect to the ground engaging portion of the calk, and longitudinally disposed recessed portions adjacent to said ribs to accommodate the metal of the shoe displaced thereby.

In testimony whereof I affix my signature, in the presence of two witnesses.

CHARLES H. GALLUP.

Witnesses:
CHAS. W. LAURENCE,
FRED W. LAURENCE.